United States Patent [19]

Fox

[11] Patent Number: 4,844,798
[45] Date of Patent: Jul. 4, 1989

[54] TIME DELAY CONTROL AND SYSTEM EMBODYING SAME

[76] Inventor: Robert J. Fox, 8680 Country Club Dr., Bowling Green, Ohio 43402

[21] Appl. No.: 257,001

[22] Filed: Oct. 13, 1988

[51] Int. Cl.$^4$ ............................................. B01D 29/02
[52] U.S. Cl. .................................. 210/106; 210/136; 210/138; 210/387; 210/406; 137/624.14; 137/907
[58] Field of Search ............... 210/104, 106, 136, 138, 210/143, 387, 406, 416.1; 137/550, 907, 624.14, 624.15

[56] References Cited

U.S. PATENT DOCUMENTS

| | | | |
|---|---|---|---|
| 1,549,206 | 8/1925 | Miller | 137/624.14 |
| 2,845,119 | 7/1958 | Guyeler | 210/138 |
| 3,618,772 | 11/1971 | Dietrich | 210/104 |
| 4,233,157 | 11/1980 | Miller | 210/387 |
| 4,571,302 | 2/1986 | Willson | 210/106 |
| 4,761,226 | 8/1988 | Crops | 210/416.1 |

Primary Examiner—Peter Hruskoci
Assistant Examiner—Christopher Upton
Attorney, Agent, or Firm—Allen D. Gutchess, Jr.

[57] ABSTRACT

A fluid-operated, time delay control and system embodying same are set forth. The time delay control includes an accumulator chamber communicating with a source of fluid under negative pressure or vacuum and a second chamber having a partition dividing it into two parts, a first of which communicates with the accumulator chamber. The second part communicates with a vacuum-sensitive switch which is energized when sensing a vacuum of a predetermined value. The partition has a check valve for maintaining the vacuum switch in communication with a vacuum after the vacuum is released at the source and the pressure rises in the first part of the second chamber. An adjustable flow control valve in the partition slowly releases the vacuum which the switch senses. The switch then reverts to a de-energized condition when a predetermined value is reached. A filtering system incorporates the time delay control with the control controlling a vacuum break valve and a motor for moving a strip of filter media.

20 Claims, 2 Drawing Sheets

TIME DELAY CONTROL AND SYSTEM EMBODYING SAME

This invention relates to a fluid-operated, time delay control and to a filtering system embodying same.

The fluid-operated time delay control includes a vacuum-sensitive switch which is energized when subjected to a predetermined vacuum or negative pressure and includes means for maintaining the vacuum in communication with the switch for a predetermined period of time after the vacuum is released in a system in which the control is embodied. The fluid-operated control can replace many, much more expensive electrical controls and does not require an electrical power source.

More particularly, the fluid-operated time delay control includes a first, accumulator chamber for separating liquid and gas and a second chamber divided into a first part and a second part by a partition. A check valve is mounted in the partition by enabling gas to flow from the second part to the first part and for preventing flow of gas from the first part to the second part. An adjustable flow control or bleed valve is also located in the partition for controlling flow of gas from the first part to the second part. The first part of the second chamber communicates with the first chamber and a vacuum-sensitive actuating switch communicates with the second part of the second chamber. The first chamber communicates with a source of fluid under a negative pressure or vacuum. When the negative pressure at the source suddenly rises or the vacuum is released, the established vacuum which the vacuum-sensitive switch senses is maintained in the second part of the second chamber for a predetermined period of time e.g. fifteen seconds to sixty seconds. This period is determined by the bleed valve which controls the rate at which gas bleeds from the first part to the second part of the second chamber to lower the vacuum which the switch senses.

The fluid-operated, time delay control is particularly effective for use in a vacuum filtering system. This system includes a tank containing liquid to be filtered. A porous support or grate is located near the bottom of the tank, on which grate a strip of filter media is located. Conveying means moves the filter strip along the grate from time-to-time as the media becomes plugged. A pump withdraws filtered liquid from the tank below the strip and the first chamber of the time delay control communicates with the inlet of the pump between the tank and the pump. As the filter media becomes increasingly plugged, the level of vacuum or negative pressure at the inlet side of the pump increases, and this vacuum or lower pressure is also transmitted to the first and second chambers and to the vacuum-sensitive switch. When the pressure decreases or the vacuum reaches a predetermined level, as set in the vacuum switch, the vacuum-sensitive switch is energized, which opens an electric or pneumatic valve to supply liquid to the inlet side of the pump, immediately raising the pressure at the inlet and in the first, accumulator chamber. The check valve blocks communication of the second part of the second chamber with the first part and with the accumulator chamber, trapping the vacuum and maintaining the vacuum-sensitive switch in its energized position. The switch, when energized, also starts a conveyor motor which advances the filter media strip across the grate in the filtering tank. The flow control valve enables the controlled flow of fluid from the first part to the second part of the second chamber, causing the pressure to rise in the second part. When the pressure is raised or the vacuum level reaches a predetermined value, as set in the vacuum-sensitive switch, that switch is de-energized, closing the electrically-operated valve and stopping the conveyor motor and movement of the filter media strip. The filter pump, which runs continuously, then continues the filtering action, drawing the liquid in the tank through the new portion of the media once again.

It is, therefore, a principal object of the invention to provide a fluid-operated time delay control and a filtering system embodying same.

Another object of the invention is to provide a fluid-operated, time delay control which is much less expensive than electrically-operated time delay controls heretofore employed.

A further object of the invention is to provide a fluid-operated, time delay control which does not require an electrical power source.

Yet another object of the invention is to provide a liquid filtering system embodying a liquid-operated, time delay control.

Many other objects and advantages of the invention will be apparent from the following detailed description of a preferred embodiment thereof, reference being made to the accompanying drawings, in which.

Figure 1:
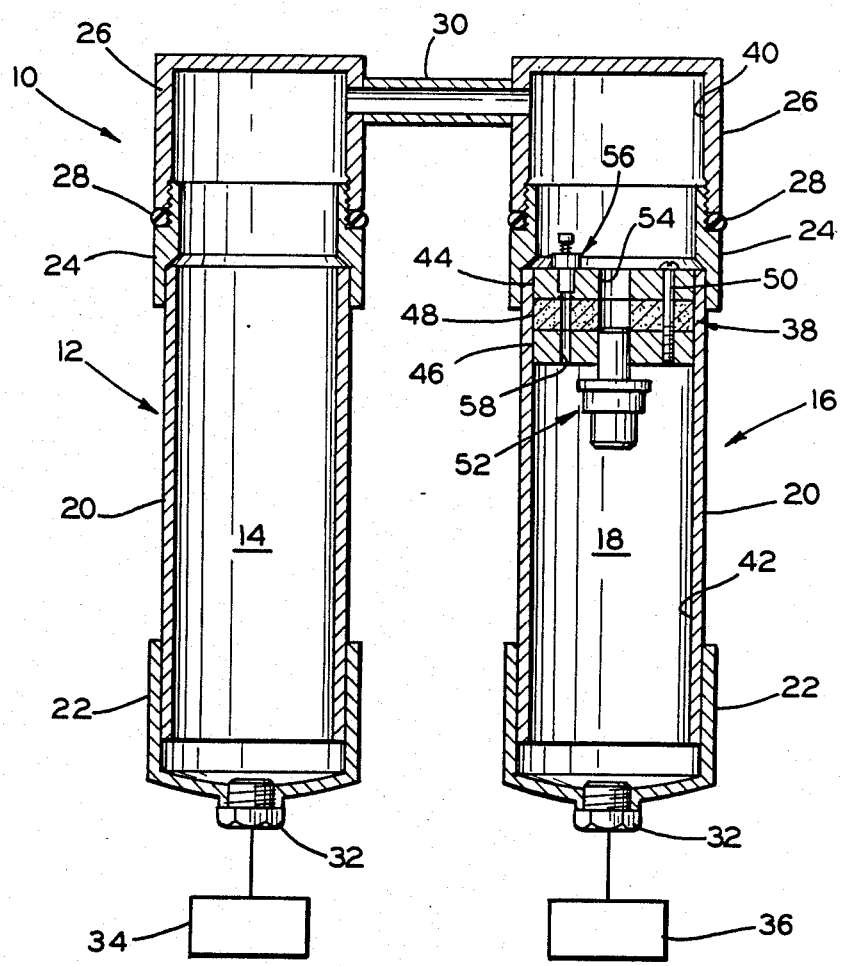
FIG. 1 is a somewhat schematic view in vertical cross section of a fluid-operated, time delay control in accordance with the invention.

Referring to the drawings, and more particularly to FIG. 1, a fluid-operated, time delay control in accordance with the invention is indicated at 10. The control includes a first container 12 forming a first chamber 14 and a second container 16 forming a second chamber 18. Each of the containers 12 and 16 comprises a cylinder 20 having a lower end cap 22 affixed thereto and an upper threaded member 24 threaded into an upper end cap 26, with O-rings 28 therebetween. A tube 30 connects the upper end caps 26 to enable the second chamber 18 to communicate with the first chamber 14. Suitable fittings 32 are threaded into the lower end caps 22. The fitting 32 for the first container 12 is connected to a suitable source 34 of fluid under a variable negative pressure or vacuum. The fitting 32 for the second container 16 is connected to a commercially-available adjustable, vacuum-sensitive switch indicated at 36.

A partition 38 separates the second chamber 18 into a first, upper part 40 and a second, lower part 42. The partition 38 consists of outer layers 44 and 46 of rigid plastic material and an intermediate layer 48 of resilient material. Three threaded fasteners or screws 50 connect the layers 44 and 46 and threadedly engage the latter to move the layers toward one another when the screws are turned in. This action squeezes the resilient layer 48 and forces it into a fixed, fluid-tight position with respect to the inner surface of the cylinder 20 of the second container 16.

A quick-acting check valve 52 is located in a larger passage 54 in the partition 38 and a flow-control or bleed valve 56 is located in a smaller passage 58 in the partition. The check valve 52 enables fluid, specifically gas, to flow from the second part 42 of the second chamber 18 to the first part 40, but prevents the flow of gas from the first part 40 to the second part 42. The flow-control valve 56 enables a controlled volume of fluid, specifically gas, to flow at a controlled rate from the first part 40 to the second part 42 of the second chamber 18.

When the vacuum increases or the pressure is lowered at the source 34, this is communicated through the first chamber 14 and through the check valve 52 to the second part 42 of the chamber 18 and to the vacuum-sensitive switch 36. When the vacuum increases or the pressure decreases to a predetermined level, as set in the switch 36, the switch is energized. The switch 36 then releases the vacuum at the source 34 (by means to be discussed later), releasing the vacuum in the chamber 14 and the first part 40 of the chamber 18. However, the check valve 52 traps the vacuum in the part 42 of the chamber 18 and the vacuum-sensitive switch 36 remains energized. The vacuum in the part 42 is slowly released through the adjustable flow-control valve 56 until the vacuum is raised to a preset level as determined in the switch, at which time the switch 36 is de-energized. The time the switch 36 is energized can be adjusted from about fifteen seconds to about sixty seconds, for example, depending upon the rate of flow through the adjustable flow control valve 56 and by the settings set for the vacuum-sensitive switch 36. Typically, the switch 36 can be adjusted to be energized at ten inches of mercury and de-energized at five inches of mercury.

Figure 2:
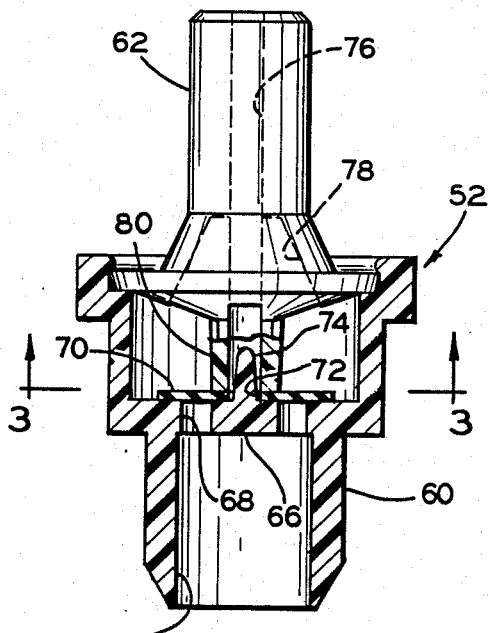
FIG. 2 is an enlarged view in vertical cross section of a check valve which is part of the control of FIG. 1.
Figure 3:
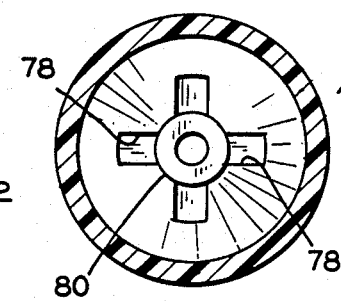
FIG. 3 is a view in transverse cross section taken along the line 3—3 of FIG. 2.

The check valve 52 must be especially fast acting in order to trap the high level of vacuum in the second part 42 of the chamber 18 when the vacuum at the source 34 is released. A check valve suitable for this purpose is commercially available as a power brake vacuum check valve from Napa in the 89000 series and particularly Part no. 89009. Referring to FIGS. 2 and 3, the check valve 52 includes snap-together housing parts 60 and 62. The part 60 has a central bore 64 with a wall 66 extending thereacross through which are a multiplicity of circumferentially-disposed openings 68. A thin, circular rubber flap 70 is supported on the upper surface of the wall 66 and covers the openings 68. The flap 70 has a central hole 72 up through which extends a narrow cone 74 from the wall 66.

The upper housing part 62 has a central bore 76 communicating with four radially-extending recesses 78. A hollow, truncated cone 80 extends downwardly around the cone 74 to hold the central portion of the flap 70 in place against the upper surface of the wall 66. The flap 70 is highly flexible to enable the check valve 52 to react quickly to trap the vacuum in the second part 42 of the chamber 18.

Figure 4:
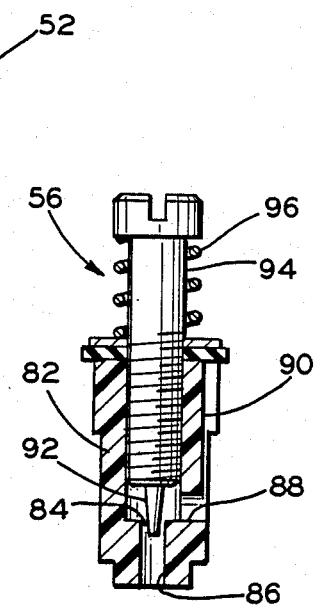
FIG. 4 is an enlarged view in vertical section of a flow control valve which is part of the control of FIG. 1.

The flow-control or bleed valve 56 can be of a number of suitable designs and, as shown, is a carburetor needle valve available from Briggs & Stratton. Referring to FIG. 4., the valve includes a housing 82 with a valve seat 84 between an axial passage 86 and a radial passage 88. The passage 88 communicates with a groove 90 whih enables fluid to flow from the first part 40 to the second part 42 of the chamber 18. The rate of flow is determined by a valve body 92 which is turned toward and away from the seat 84 by a functionally-integral screw 94 which is prevented from accidental turning by a spring 96. The flow control valve 56 can be adjusted by unscrewing the member 24 from the end cap 26 to expose the slotted head of the screw 94.

Figure 5:
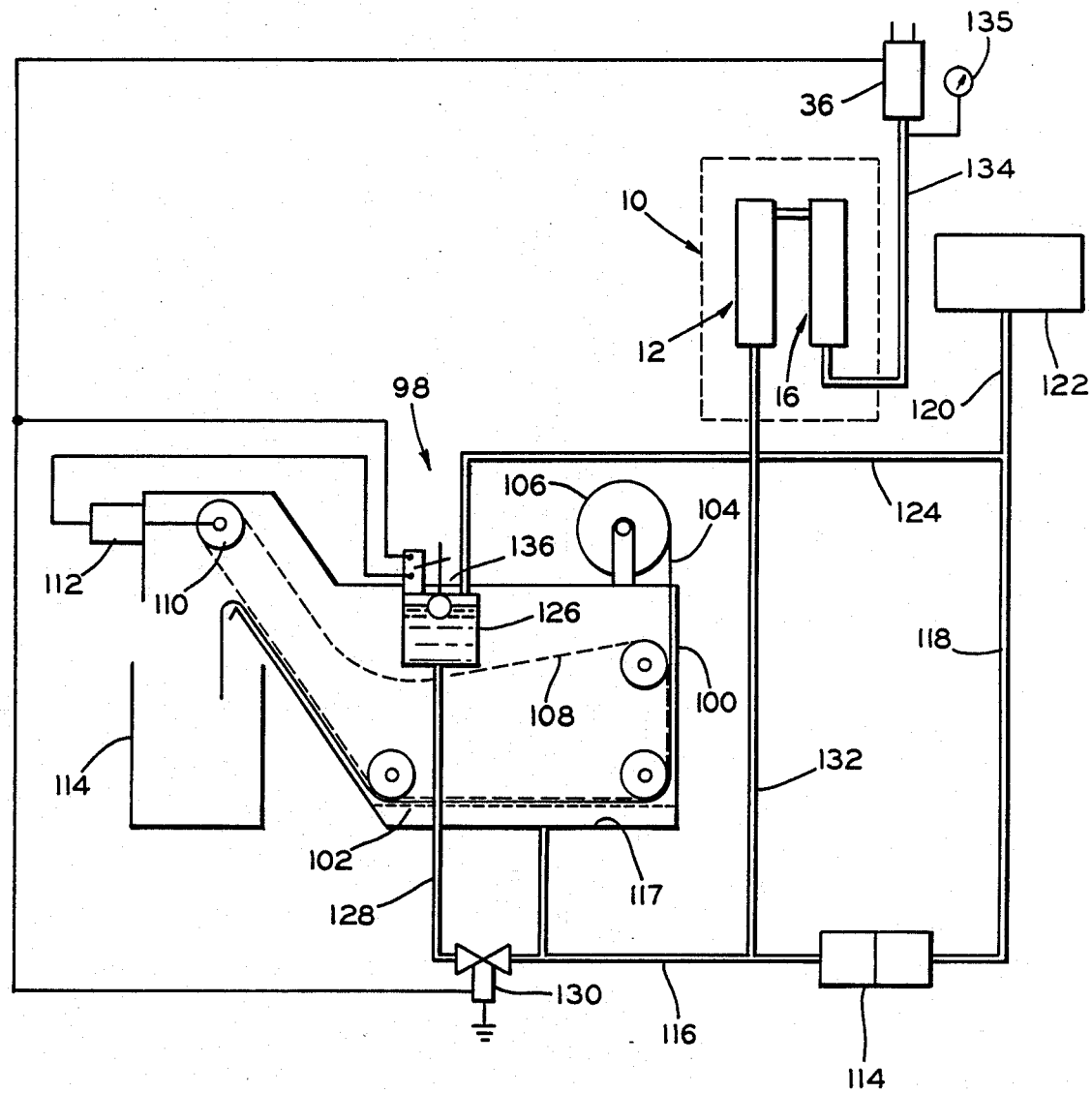
FIG. 5 is a diagrammatic view of a liquid filtering system embodying the fluid-operated, time delay control of FIG. 1.

A system embodying the fluid-operated, time delay control 10 is shown in FIG. 5. A filtering unit 98 is used to filter solids from a liquid. The unit includes a tank 100 with a porous or perforate support or grate 102 located above the bottom of the tank to support a portion of a strip 104 of filter media. The strip 104 is carried from a supply spool 106 to the bottom of the tank and across the supporting grate 102 by a suitable chain or mesh conveyor 108. The conveyor is moved by a drive sprocket 110 which is driven by a suitable electric motor 112. The filter strip is moved down the end of the tank 100, across the grate 102, and up the other end of the tank where it falls into a receptacle 114.

The filter strip 104 is not moved continuously across the grate 102, but periodically, when the filer media becomes sufficiently plugged or clogged. The liquid is drawn through the filter media by a pump 114 having an inlet line 116 connected to an outlet chamber 117 of the tank 100 below the grate 102. An outlet line 118 of the pump supplies the filtered liquid through a line 120 to a receiver 122. If the filtered liquid is a coolant, the receiver can be a metal working machine using the coolant or a reservoir for a plurality of the metal working machines, by way of example. A branch outlet line 124 supplies a portion of the liquid from the pump 114 to a reservoir tank or trough 126 located in an upper portion of the tank 100. Liquid overflowing the edge of the reservoir tank 126 falls into the tank 100 and is filtered again. An outlet line 128 connects the reservoir tank 126 with the inlet line 116 of the pump 114 through an electric or pneumatic release valve 130. This breaks the vacuum or raises the negative pressure in the line 116 when the valve is opened, as will be discussed more fully subsequently.

The accumulator chamber 14 of the container 12 is connected by a line 132 with the inlet line 116 of the pump 114, with the line 116 serving as the vacuum source 34. The second chamber 18 of the control 10 is connected to the vacuum-sensitive switch 36 through a line 134. A pressure gauge 135 is also located in the line 134.

In operation, as the filter media 104 on the supporting grate 102 becomes more plugged, the vacuum increases in the pump inlet line 116 and this increased vacuum is communicated through the chambers 14 and 18 to the pressure-sensitive switch 36. When the vacuum reaches a predetermined level, as set in the swtich 36, the switch is energized. It then opens the electric or pneumatic valve 130, which is normally closed, to supply liquid from the reservoir 126 through the line 128 and to the pump inlet line 116, immediately breaking or releasing the vacuum. The filter strip 104 can then be more easily moved over the grate 102. At this time, liquid may flow through the line 132 into the accumulator chamber 14 but will not flow further to possibly cause damage to the elements in the chamber 18. The accumulator chamber 14 thereby maintains the gas, specifically air, and the liquid separate.

A sudden increase in pressure in the chamber 14 also occurs in the first part 40 of the chamber 14. However, the vacuum in the second part 42 of the chamber 18 is trapped by the quick-acting check valve 52. Hence, the pressure-sensitive valve 36 remains energized for a predetermined period of time. This period is determined by the rate of flow of gas from the first part 40 to the second part 42 of the chamber 18 as set by the bleed valve 56. It is also determined by the lower setting in the pressure-sensitive valve 36 at which the valve 36 will become de-energized.

While the valve 36 is energized, it also operates the motor 112 to cause the conveyor 108 to advance the filter media so that a new portion thereof is in the filtering position on the grate 102. The line from the switch to the motor 112 is in series with a level-sensitive switch 136 in the tank 126 so that the motor 112 will not be energized if the reservoir tank 126 is not full. Rather than moving the strip 104, if no strip is used, the motor 112 can operate a scraper to clean the grate 102.

The fluid-operated, time delay control 10 thus provides the necessary controls for the filtering unit 98 in place of relatively complicated electrical controls heretofore used which have cost several thousand dollars.

Various modifications of the above-described embodiments of the invention will be apparent to those skilled in the art and it is to be understood that such modifications can be made without departing from the scope of the invention, if they are within the spirit and the tenor of the accompanying claims.

- I claim:

1. In combination, a vacuum-sensitive actuating switch, means forming a vacuum source, chamber means, first passage means connecting said chamber means with said vacuum source means, second passage means connecting said chamber means with said vacuum-sensitive actuating switch, a check valve in said chamber means for enabling fluid to flow from said second passage means toward said first passage means and for preventing flow of fluid from said first passage means toward said second passage means, and an adjustable bleed valve in said chamber means for enabling a controlled flow of fluid from said first passage means toward said second passage means.

2. The combination according to claim 1 wherein said check valve comprises a wall having a plurality of openings therein and a highly flexible flap covering said openings when said check valve is in a closed position.

3. The combination according to claim 1 wherein said bleed valve comprises a valve seat, a valve body, and threaded means for moving the valve body toward and away from said valve seat.

4. The combination according to claim 1 wherein said vacuum source comprises a pump inlet line located between a pump and a liquid filtering unit.

5. The combination according to claim 4 further comprising means for releasing vacuum in said inlet line comprising a liquid reservoir, a supply line connecting said reservoir and said inlet line, and a release valve in said supply line.

6. The combination according to claim 5 further comprising means connecting said vacuum-sensitive switch and said release valve to enable said vacuum-sensitive switch to open and close said release valve.

7. The combination according to claim 6 wherein said liquid filtering unit has filter means, means for renewing said filter means, and means connecting said vacuum-sensitive switch and said renewing means to enable said vacuum-sensitive switch to operate said renewing means when said release valve is opened.

8. The combination according to claim 4 wherein said filter unit has filter means, means for renewing said filter means, and means connecting said vacuum-sensitive switch and said renewing means to enable said vacuum-sensitive switch to operate said renewing means.

9. A time delay control comprising means forming a first chamber for separating liquid and gas, means forming a second chamber, partition means dividing said second chamber into a first part and a second part, a check valve in said partition means for enabling gas to flow from said second part to said first part and for preventing flow of gas from said first part to said second part, an adjustable bleed valve in said partition means, passage means connecting said first part and an upper portion of said first chamber, passage means for connecting a lower portion of said first chamber and a vacuum source means for releasing vacuum from said vacuum source, a vacuum-sensitive actuating switch, passage means connecting said vacuum-sensitive switch with said second part of said second chamber, whereby said vacuum source can establish a negative pressure in said first chamber and said first part and said second part of said second chamber and a negative pressure can be maintained in said second part for a predetermined period of time determined by said bleed valve, when vacuum is released at said vacuum source.

10. A time delay control according to claim 9 wherein said partition has a large passage therethrough and said check valve comprises a wall extending across said partition passage and having a plurality of openings therein, and a highly flexible flap covering said openings when in a closed position.

11. A time delay control according to claim 10 wherein said partition has a smaller passage therethrough parallel with said larger passage, and said bleed valve comprises a valve seat located in said smaller passage, a valve body, and means for moving said valve body toward and away from said valve seat.

12. A time delay control according to claim 9 wherein said partition has a smaller passage therethrough, and said bleed valve comprises a valve seat in said partition passage, a valve body, and threaded means for moving said valve body toward and away from said seat.

13. A time delay control according to claim 12 wherein said second chamber forming means further comprises a cylinder and cap means separate and separable from said cylinder, and said moving means for said valve body being exposed for adjustment when said cylinder and said cap means are spearated.

14. A time delay control according to claim 9 wherein said second chamber forming means comprises a cylinder, said partition means comprises two rigid layers, a resilient layer therebetween, means for connecting said rigid layers and for moving said rigid layers toward and away from one another, whereby said resilient layer can be squeezed outwardly into fluid-tight relationship with an inner surface of said cylinder when said rigid layers are moved toward one another.

15. In combination, a liquid tank containing liquid, filter means in said tank through which the liquid can pass with resistance, means forming an outlet chamber in said tank on one side of said filter means, means for renewing said filter means, a pump for withdrawing liquid from said outlet chamber, first passage means connecting an inlet of said pump and said outlet chamber, and a time-delay control comprising means forming a first chamber for separating liquid and gas, second passage means connecting said first chamber means and said first passage means between said pump and said outlet chamber, means forming a second chamber, wall means dividing said second chamber into a first part and a second part, third passage means connecting said first part and an upper portion of said first chamber, a check valve in said wall means enabling flow of gas from said second part to said first part and preventing flow of gas from said first part to said second part, a bleed valve in said wall means for enabling limited flow of gas from said first part of said second chamber to said second part, a vacuum sensitive switch, and fourth passage means connecting said vacuum-sensitive switch with said second part of said second chamber, said vacuum-sensitive switch being operatively connected with said renewing means for activating said renewing means when the pressure in said second part of said second chamber is below a predetermined value and for deactivating said renewing means when the pressure in said second part rises to another predetermined value.

16. The combination according to claim 15 further comprising a liquid reservoir, a supply line connecting said liquid reservoir and said first passage means, a release valve in said supply line, and means connecting said vacuum-sensitive switch with said release valve for opening said release valve when the pressure in said second part of said second chamber is below said predetermined value and for closing said release valve when the pressure in said second part rises to said another predetermined value.

17. The combination according to claim 16 further comprising a level-sensitive switch in said liquid reservoir and means connecting said level-sensitive switch with said vacuum-sensitive switch and said renewing means for preventing operation of said renewing means when the liquid in said reservoir is below a predetermined level.

18. The combination according to claim 15 wherein said filter means is a strip of filter media and said renewing means comprises motor means for moving said strip of filter media past said outlet chamber.

19. The combination according to claim 15 wherein said bleed valve is adjustable and said second chamber forming means is separable to enable access to said bleed valve for adjusting same.

20. The combination according to claim 15 further comprising a liquid reservoir associated with said liquid tank, a branch line connecting an outlet of said pump with said liquid reservoir, a level-sensing switch in said liquid reservoir and connected between said vacuum-sensitive switch and said renewing means for preventing operation of said renewing means when the liquid in said liquid reservoir is below a predetermined level, a supply line connecting said liquid reservoir with said first passage means, an electrically-operated valve in said supply line, and said electrically-operated valve being connected with said vacuum sensitive switch for opening said electrically-operated valve when said renewing means is activated.

* * * * *

UNITED STATES PATENT AND TRADEMARK OFFICE
CERTIFICATE OF CORRECTION

PATENT NO. : 4,844,798

DATED : July 4, 1989

INVENTOR(S) : Robert J. Fox

It is certified that error appears in the above-identified patent and that said Letters Patent is hereby corrected as shown below:

Column 4, line 18, "filer" should read --filter--

Column 6, line 7, claim 9, line 7, "peventing" should --preventing--.

Signed and Sealed this

Thirteenth Day of March, 1990

*Attest:*

JEFFREY M. SAMUELS

*Attesting Officer*   *Acting Commissioner of Patents and Trademarks*